United States Patent [19]

Wagner et al.

[11] 4,079,102

[45] Mar. 14, 1978

[54] PRINTING INK BINDER

[75] Inventors: Reinhard Wagner, Naurod; Gerhard Warner, Glashutter; Hans-Jürgen Tietz, Langenhain, all of Germany

[73] Assignee: Hoechst Aktiengesellschaft, Frankfurt, Germany

[21] Appl. No.: 704,956

[22] Filed: Jul. 13, 1976

Related U.S. Application Data

[63] Continuation of Ser. No. 521,503, Nov. 6, 1974, abandoned.

[30] Foreign Application Priority Data

Nov. 10, 1973 Germany .............................. 2356324

[51] Int. Cl.$^2$ ............................................ C08F 279/02
[52] U.S. Cl. ........................... 260/879; 260/33.6 UA; 106/20
[58] Field of Search ......................................... 260/879

[56] References Cited

U.S. PATENT DOCUMENTS

| | | | |
|---|---|---|---|
| 2,475,234 | 7/1949 | Gleason | 260/879 |
| 2,608,550 | 8/1952 | Rowland | 260/879 |
| 3,574,792 | 4/1971 | Hayashi | 260/879 |
| 3,775,381 | 11/1973 | Hayashi | 260/78.4 D |

*Primary Examiner*—Paul R. Michl
*Attorney, Agent, or Firm*—Littlepage, Quaintance, Murphy, Richardson and Webner

[57] ABSTRACT

A modified hydrocarbon resin comprising (A) a major amount of a cycloaliphatic diene resin component and (B) a minor amount of an olefinically unsaturated polycarboxylic acid component, wherein at least 5% of the carboxyl groups are esterified with an alcohol selected from the group consisting of (a) a monohydric, (b) a dihydric alcohol and (c) a combination of (a) and (b), a process for its preparation and a printing ink composition containing said modified hydrocarbon resin.

13 Claims, No Drawings

PRINTING INK BINDER

This is a continuation of application Ser. No. 521,503, filed Nov. 6, 1974, which is now abandoned.

This invention relates to printing inks and in particular to inks for intaglio printing.

The binding agents for intaglio printing inks are conventionally made from colophony. This natural product is, however, subject to fluctuations in quality and supply. In addition resins based on colophony have many other commercial applications. Thus it is becoming increasingly desirable, on account of the limited supply of colophony, to develop synthetic resins with similar properties in order to become independent on this raw material.

High melting resins have been prepared by polymerisation of cyclopentadiene and/or methyl-cyclopentadiene or their oligomers. These products are not thermally stable and are unsuitable as intaglio printing resins. Low-melting types dry badly and high-melting ones are difficult to handle on account of their excessively high viscosity. The printing inks produced therefrom have a poor gloss and colour intensity due to the poor wetting capacity of these resins as binders.

According to further publications, maleic anhydride can be added to the known hydrocarbon resins, but these adducts are unsuitable as printing ink binding agents owing to their low melting points and the low colour intensity of the inks produced therefrom. The previously-mentioned disadvantages also apply to these adducts.

Moreover it is known that unsaturated acids, such as tetrahydrophthalic acid and/or maleic acid and/or their anhydrides, can be added to hydrocarbon resins, thus yielding products which may be suitable as binding agents for intaglio printing inks. These binding agents, however, give inks having an inadequate colour intensity and poor drying properties.

Hydrocarbon resins, containing 10 to 35% diolefins and 30 to 65% mono-olefins, can be modified by reaction with maleic anhydride at a temperature above 130° C but below the decomposition temperature of the resin, and the products obtained can be subsequently reacted with 0.1 to 1 mol of a polyhydric alcohol. The products obtained however are not suitable as printing ink binding agents, since they have too low a melting point on account of the excessively high monoolefin content of the starting resin.

Another publication describes the use (as a printing ink binder) of a resin based on cyclo- and/or methyl cyclopentadiene, which is modified with fatty acids. However, the drying properties of inks containing such modified resins are unsatisfactory. As is further described therein, the drying properties can be improved by reaction of the resin with a metal salt. However, these metal-containing resins have poor pigment wetting properties and thus the dried print on the paper is matt and has a low colour intensity.

The present state of the art may be summarised as follows. Acid adducts of aromatic petroleum resins can be esterified. When they are esterified with monohydric alcohols, low-melting resins are yielded. These resins however have poor drying properties and are therefore unsuitable as printing ink binding agents. According to another known process, products which are suitable as printing ink binders can be prepared from very high-melting aromatic petroleum resins with a particularly high indene content. These products can be esterified with monohydric alcohols, thus lowering their melting points. The use of polyhydric alcohols is, according to this process, undesirable, since the resultant products from solutions of extremely high viscosity, or do not exhibit film-forming properties.

It was thus to be expected that on esterifying cure aliphatic hydrocarbon resins containing almost no indene, with monohydric alcohols low viscosity, poorly drying resins would be obtained. On the other hand on esterifying such resins with polyhydric alcohols highly cross-linked reaction products having a high viscosity and having insoluble constituents would be expected. Such products would have a high melting viscosity and be technically difficult to handle.

We have now developed a resin binder for use in nonaqueous printing inks which does not have the above-mentioned disadvantages and which possesses many of the properties of the colophony resins in use at the present time. So that it is at least equivalent to said colophony resins. This new resin is particularly suitable for toluene intaglio printing.

The invention provides a modified hydrocarbon resin comprising A) a major amount of a cycloaliphatic diene resin component and B) a minor amount of an olefinically unsaturated polycarboxylic acid component, wherein at least 5%, preferably from 10 to 60% of the carboxyl groups are esterified with a monohydric and/or dihydric alcohol.

The expression "a polycarboxylic acid component" is used herein to include derivatives of polycarboxylic acids containing or forming carboxyl groups, such as for example compounds containing anhydride groups, ester or half ester groups or amide groups.

The modified hydrocarbon resins according to the invention are characterised by relatively high melting points and thus a high thermal stability.

The cycloaliphatic diene resin component (A) may for example be prepared from cyclopentadiene, methylcyclopentadiene or dicyclopentadiene monomer units. It is generally prepared from hydrocarbon fractions boiling within the temperature range 20° to 180°, preferably 30° to 165° C which generally also contain other unsaturated monomers, such as, for example, propylene, butene, butadiene, pentene, isoprene, cyclopentene and cyclohexene. The starting diene resin component (A) is generally obtained by thermal polymerisation in per se known manner of the hydrocarbon fraction, e.g. at temperatures up to 300° C, preferably above 200° C, optionally in the presence of a solvent and/or with the use of increased pressure. The starting resins can also be prepared by polymerisation in the presence of known peroxide or Friedel-Craft catalysts, in known manner. These starting resins are light-coloured, have a melting point of at least 40° C, preferably at least 60° C, and a bromine number of at least 30, preferably at least 45. By carefully controlling the polymerisation reaction or by careful selection of starting materials, e.g. of the monomers products suitable as the diene resin component can be prepared having a melting point within the range 50° to 250° C. Adjustment of the melting point within this range can also be effected, for example, by means of an additional distillation to remove the low-boiling monomer constituents.

The unsaturated polycarboxylic acid componente is preferably an $\alpha,\beta$-olefinically unsaturated polycarboxylic acid having from 4 to 8 C-atoms, or a derivative thereof. Suitable acids thus include, for example, maleic acid, fumaric acid, itaconic acid, citraconic acid and tetrahydrophthalic acid either alone or in admixture. The polycarboxylic acid component may conveniently contain anhydride, ester, or amide groups, the ester groups being preferably derived from alcohols with up to 10, especially from 2 to 8 C-atoms, for example those mentioned hereinafter.

The resins according to the invention may if desired additionally contain an olefinically unsaturated monocarboxylic acid component being chemically built in, preferably a monocarboxylic acid with 3 to 12 C-atoms, such as acrylic, methacrylic or sorbic acid, or a derivative thereof, either alone or in admixture. The monocarboxylic acid component when used is preferably present in an amount up to 200% preferably from 20 to 100% by weight of the polycarboxylic acid component.

In the modified resins according to the invention, the total weight of olefinically unsaturated carboxylic acid components is conveniently from 1 to 50%, preferably 10 to 30% by weight, based on the diene resin component.

The presence in the resin of the carboxylic acid components, such as carboxylic groups, and more particularly esterified carboxyl groups increases the pigment compatibility of the resin and improves the gloss of printing inks produced therefrom. Esterification gives rise to an increased molecular weight, faster solvent evaporation, higher gloss and improved colour intensity.

The carboxyl groups are preferably esterified with alcohols having up to 20 C-atoms. The alcohols may be primary, secondary or tertiary, aliphatic or cycloaliphatic, straight-chained or branched, and they may contain cycloaliphatic or aromatic groups. Thus for example the carboxyl groups in the resin may be esterified with any of the following alcohols: monovalent alcohols with 2 to 12, preferably 4 to 12, C-atoms, such as ethanol, the propanols, butanols, pentanols, hexanols, octanols, nonanols and dodecanols, 2-ethyl-hexanol and cyclohexanol; polyhydric alcohols, e.g. di- to hexahydric alcohols, preferably those with up to 12 C-atoms, such as 1,4-xylylene -diol, ethylene glycol, propylene glycol, the butane diols, the pentane diols, the hexane diols; dimethylolcyclohexane; trimethylol-ethane or -propane, glycerol, pentaerythritol and dipentaerythritol either alone or in admixture. Esterification of the carboxyl groups with monohydric alcohols does not appear to result in the expected lowering of the melting point of the final resin.

It is also possible to further modify the resins according to the invention by mixing in and/or by chemically building in another natural or synthetic resin. This can for example be achieved by the additional resins being present during the formation of the acid adduct and/or during the esterification. Suitable resins are, for example, aliphatic hydrocarbon resins, salts of acid-modified synthetic resins, cumarone-indene resin, natural resins, such as colophony, tall resinic acid, wood resin and their esters or resinates, calcium-modified, hydrogenated and disproportionated colophony, colophony/maleic anhydride-adducts; phenol formaldehyde resins, telomers of maleic anhydride and vinyl aromatic compounds, particularly styrene, but preferably acid-modified aromatic hydrocarbon resins, colophony-phenol resins and alkylphenol-formaldehyde resins.

Thus the modified hydrocarbon resins according to the invention may additionally contain 2 to 50%, preferably 3-15% by weight (based on the starting diene resin component) of natural resins of their acids, particularly colophony. Modification with natural resins is most conveniently effected by chemical addition at the polycarboxylic acid component (B) to the diene resin component (A) in the presence of said natural resins or their acids.

The presence of natural resin components gives rise to a lower melting viscosity and a better compatibility with other components of the composition, particularly with gilsonite, a type of asphalt, frequently used as a black dye in printing inks. Moreover, it has now been shown that the presence of acid-modified aromatic hydrocarbon resins and the colophony-phenol resins, as additives and/or as chemically built-in components, of the modified resins according to the invention when used as printing ink binding agents, gives rise to a better gloss and improved compatibility with other components of the printing ink, particularly with ethyl cellulose used as a drying accelerator. The presence of alkylphenol-formaldehyde resins results in better drying properties and the presence of salt-containing telomers leads to better pigment wetting with certain pigments.

According to a further modification of the invention, the resins may additionally contain a phenolic component which may be present in unbound form or may be at least partially built-in. The phenol component is preferably present in an amount up to 5%, conveniently 1 to 2% by weight, based on the weight of the diene resin component. The presence of a phenol component is advantageous since it serves to avoid or reduce thermal polymerisation resulting in an undesirable increase of viscosity which often accompanies formation of the acid adduct. The phenol component may for example contain one or more of the following phenols: phenol, the alkylphenols, such as cresol, n- or isobutylphenol, octylphenol, 2,6-di-tert.-butyl-4-methylphenol and 2,2-methylene-bis-(4-methyl-6-tert.-butyl)-phenol, bisphenols, such as diphenylolpropane or diphenylolmethane, and also hydroquinone either alone or in admixture.

Finally, at least some, for example 0.1 to 10%, preferably 1 to 3%, of the unesterified carboxyl groups may if desired be present in salt form with a metal of groups I to III of the Periodic Table. Suitable metals are for example sodium, potassium, calcium, strontium, magnesium, zinc, cadmium and aluminium. The formation of these metal salt groups may be effected by known methods, for example by reaction of the acid groups with suitable metal compounds, for example zinc oxide, aluminium oleate or magnesium oxide.

According to a further feature of the present invention there is provided a process for the preparation of a modified hydrocarbon resin according to the invention which comprises reacting (A) a major amount of a cycloaliphatic diene resin component with (B) a minor amount of an olefinically unsaturated polycarboxylic acid component and after completion of at least a part of the reaction esterifying at least 5%, preferably 10 to 60%, of the carboxyl groups with a monohydric and/or a polyhydric alcohol.

Conveniently, the esterification is effect by addition of alcohol when the reaction of component (A) with component (B) is almost completed e.g. about 80% complete. However, it is also, in principle, possible to begin esterification shortly after addition of component (B) to component (A). The process may be conveniently carried out in a melt especially when the esterification is commenced early. It is, however, also possible to carry out the process in the presence of a solvent, and advantageously under increased pressure. It is also preferable to work at higher pressure if esterification is being performed with low molecular weight, volatile alcohols, in order to avoid undesirable evaporation of the alcohol.

Suitable solvents for the process according to the invention include, for example, aromatic hydrocarbons such as benzene and alkyl benzenes boiling within the temperature range of 100° to 200° C or 150° to 200° C, e.g. toluene, xylene, ethylbenzene and cumene, and commercially produced mixtures of these hydrocarbons. such as those, e.g. which are marketed under the brand name "Solvesso 100" or "150"; halogenated hydrocarbons with a boiling range of 55° to 230° C, such as chlorobenzene, chloroform and carbon tetrachloride; aliphatic hydrocarbons such as white spirit and tetrahydronaphthalene; dimethylformamide; ketones with a boiling range of 55° to 200° C, such as cyclohexanone and methyl ethyl ketone; esters with a boiling range of 60° to 230° C, such as ethyl acetate, butyl acetate, iso-octyl acetate and benzyl acetate; and ethers, such as di-n-butyl ether and glycidyl ether. The solvent used preferably has a boiling temperature above 100° C, preferably above 120° C; it is, however, also possible to use low-boiling solvents, but the reaction must be performed under increased pressure.

The modified hydrocarbon resins according to the invention contain either no or very little colophony. They are suitable as printing ink binding agents both alone or in admixture with other resin binders. They have particularly good drying properties and have good pigment wetting characteristics. They are especially suitable for intaglio printing. Thus according to a yet further feature of the invention there is provided a printing ink composition which comprises a modified hydrocarbon resin according to the invention as binder, a pigment and a non-aqueous medium. The use of a resin binder according to the invention enhances the colour intensity of the printed ink. This means that the printed ink appears deeper and the effect is greater than when using conventional printing ink binders at similar pigment concentrations. The binders according to the invention are also particularly effective with pigments which are difficult to disperse, such as milori blue.

The following Examples serve to illustrate the preparation of the modified hydrocarbon resins according to the invention. In the Examples T indicates parts by weight and percentages are by weight. Unless otherwise stated viscosities were measured in 50% toluene solution at 20° C.

EXAMPLE 1

(a) 500 T of a commercially produced hydrocarbon resin prepared thermally (m.p.: 60° to 75° C; Viscosity 10 to 20 cP; containing over 50% cyclopentadiene and derivatives thereof, the remnant being aromatic hydrocarbons) were stirred for 4 hours with 40 T of maleic anhydride at a temperature of about 200° C. The pressure of the reaction vessel was then reduced to 60 mm Hg and the temperature was held at 200° C for a further hour. 6.3 T of trimethylol propane were then added with stirring and the mixture was heated at 240° C for 3 hours. 520 T (yield 95%) of a resin with a viscosity of 310 cP and a melting point of 170° C were obtained.

(b) The reaction of the hydrocarbon resin and maleic anhydride was carried out as in Example 1a but the mixture was heated at 200° C under atmospheric pressure for 1 hour only and then for a further hour at the same temperature under reduced pressure. 6.3 T of trimethylol propane were then added and the mixture was heated rapidly to 240° C and held at this temperature for 3 hours. 520 T (yield 95%) of a resin with a viscosity of 310 cP and a melting point of 168° C were obtained.

(c) The reaction was carried out as in Example 1a but a mixture of 14 T of acrylic acid and 20 T of fumaric acid was used in the place of the maleic anhydride. 515 T (yield 94%) of a resin with a viscosity of 330 cP and a melting point of 172° C were obtained.

(d) The reaction was effected as in Example 1a but using a mixture of 1.1g of sorbic acid and 40 g of tetrahydrophthalic acid in the place of the maleic anhydride. 530 T (yield 95.5%) of resin with a viscosity of 350 cP and a melting point of 166° C were obtained.

(e) Comparative Example

The reaction was effected analogously to Example 1a but omitting the esterification step. 543 T (yield 96%) of a resin with a viscosity of 20 cP and a melting point of 110° C were obtained.

EXAMPLE 2

(a) An adduct was prepared from 500 T of the hydrocarbon resin used in Example 1a and 80 g of maleic anhydride. 25 T of hexan-1-ol were then added and the mixture was then heated to about 240° C. After 7 hours, 578 T (yield 96%) of a partially esterified product with a viscosity of 374 cP and a melting point of 175° C were obtained.

(b) A resin was prepared analogously to Example 2a but using 25g of hexan-2-ol. 581 T (yield 96%) of a resin with a melting point of 170° C and a viscosity of 365 cP were obtained.

(c) A resin was prepared analogously to Example 2a but using 22 g of benzyl alcohol. 570 T (yield 94.5%) of a resin with a melting point of 173° C and a viscosity of 380 cP were obtained.

(d) A resin was prepared analogously to Example 2a but using 5 T of neopentylglycol and 25 T of 2-ethylhexan-1-ol and stopping the esterification after 3 hours. 592 T (yield 97%) of a resin with a melting point of 173° C and a viscosity of 396 cP was obtained.

(e) Comparative Example

The reaction was effected analogously to Example 2a but omitting the esterification step. 556 T (yield 96.2%) of a resin with a melting point of 120° C and a viscosity of 30 cP were obtained.

Preparation of Printing Inks and Printing Tests

A 50% solution in toluene of each of the resins prepared according to Examples 1a to 1d and 2a to 2e was prepared and each solution was put into a DIN-4 cup which was adjusted to an outflow time of 16 seconds. 6% of a commercial red pigment was then added and the mixture was dispersed in known manner. Preparation of the ink was completed by adjusting the dispersion to an outflow time of 16 seconds by a further addition of toluene.

The printing ink was applied to a paper base in 6 superimposed layers of 6μ thickness. The drying time was measured and the gloss was assessed by Lange's method. The colour density was measured by means of a colour densitometer (type "Densochrom" manufactured by Messrs. Gretag) and the glaze was estimated in the usual way by visual comparison. For the colour intensity measurements the intaglio printing plates were produced on an intaglio-printing proofing machine of the system "Labra-Tester" with the screen II at a special etching depth. It was found that in general the finer the pigment distribution, the higher the value of the colour intensity and the better the glaze. The test results are given in the following Table.

It was not possible to produce a 50% toluene solution of the resin prepared according to Example 1e with an outflow time of 16 seconds with a sufficiently high pigment concentration. Thus a toluene solution of the resin was prepared having the same resin concentration as that used with the resins of Examples 1a and 1b. In other respects the preparation of the printing ink and the printing test was exactly the same as hereinbefore described. By this means it was possible to compare the suitability of the resin of Example 1e as a binding agent with that of the resins of the Examples according to the invention.

In addition a commercially available phenol-modified colophony resin was tested in similar manner and the results compared with those given by the resins according to the present invention.

The results of the above tests are summarised in the following Table:

EXAMPLE 4

A resin was prepared analogously to Example 3 but adding 4 T of diphenylolpropane together with the above-specified alcohol mixture. 604 T (yield 98.4%) of a resin with a melting point of 175° C and a viscosity of 350 cP were obtained. The resin had the required characteristics for a printing ink binder.

EXAMPLE 5

A resin was prepared analogously to Example 3 but adding 2g of calcium acetate together with the alcohol mixture. 602 T (yield 97.9%) of resin were obtained. The resin fulfilled the requirements for a printing ink binder described in the preceding Examples, in particular with respect to colour intensity M.P. 178° C, viscosity 400 cP.

EXAMPLE 6

A resin was prepared analogously to Example 1a, but using a commercial hydrocarbon resin with a melting point of 50° to 60° C and a viscosity of 8 to 10 cP (cyclopentadiene content above 50%, residual components

Table

| Sample No. | Colophony-phenol resin-reaction product (comparison) | 1 a) | 1 b) | 1 c) | 1 d) | 1 e) (comp) | 2 a) | 2 b) | 2 c) | 2 d) | 2 e) (comp) |
|---|---|---|---|---|---|---|---|---|---|---|---|
| Drying time (sec) | 50.3 | 48 | 50 | 48 | 47 | 87 | 48.1 | 49.5 | 48.5 | 46 | 70 |
| Gloss 3μ | 20 | 30.5 | 33 | 34 | 31 | 30 | 31 | 30.5 | 30.3 | 32 | 30 |
| 6μ | 6.5 | 8.5 | 8.5 | 9 | 8 | 8 | 8.5 | 8.3 | 8 | 9.7 | 8.5 |
| Colour depth (log. units) | 1.65 | 1.85 | 1.9 | 1.95 | 1.75 | 1.7 | 1.93 | 1.94 | 1.97 | 2.06 | 1.2 |
| Glaze | Worse than 1a) to 1d) | | | | | good | | | | | |

Discussion of the Results

As can be seen from the Table, in general all the resins according to the invention give inks which have a shorter drying time than the comparison samples. Moreover, the gloss, intensity and glaze are noticeably better than the colophony-based inks. The unesterified maleic anhydride adducts (Examples 1e and 2e) however give inks having better gloss, colour intensity and glaze characteristics than the colophony resins, but the drying times of the inks are so long as to render these resins unsuitable as printing ink binders. Furthermore, the resins melt at temperatures of less than 130° C; thus they would adhere to the hot rollers during the printing process. Consequently they are not suitable as printing ink binding agents for this reason also. It was also ascertained that the use of monovalent alcohols (see Examples 2b and 2c) leads to a decrease in the melting viscosity, thus making the resins easier to handle. On the other hand, better colour intensity, as compared with the resins of Examples 1a to 1d is obtained.

EXAMPLE 3

450 T of the starting resin used in Example 1a and 50 T of colophony were melted toggether. 80 T of malei anhydride were then added, and the mixture was heated, with stirring, at 200° C for 4 hours. The resin was then esterified analogously to Example 2d. 596 T (yield 97.5%) of a resin with a melting point of 170° C and a viscosity of 370 cP were obtained. This corresponds to the technical printing requirements.

aromatic hydrocarbons) and 50g of maleic anhydride, and esterifying with 7.5g of trimethylol propane. 542 T (= 98%) of a resin with a melting point of 164° C and a viscosity of 290 cP were obtained. The produce demonstrates good properties as a binding agent for toluene intaglio printing inks.

EXAMPLE 7

500 T of the hydrocarbon resin used in Example 1a and 100g of an indene-rich hydrocarbon resin (melting point 150° C, viscosity 150 cP, residual constituents: aromatic hydrocarbons) were reacted as in Example 1a, but using 50g of maleic anhydride. Esterification with trimethylol propane was effected according to Example 1a. 638 T (yield 96.7%) of a resin with a melting point of 175° C and a viscosity of 370 cP were obtained.

The product had favourable properties as a binding agent for toluene intaglio printing inks. It was distinguished from the resin obtained in Example 1a by its shorter drying time. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A printing ink composition which comprises as a binder a modified hydrocarbon resin being a reaction product of (A) a major amount of a cycloaliphatic diene resin component said cycloaliphatic resin having been derived from polymerizable hydrocarbon monomers containing more than 50% by weight of cycloaliphatic diene monomers and (B) 1 up to 50% by weight of an olefinically unsaturated polycarboxylic acid component, wherein at least 5% of the carboxyl groups are esterified with an alcohol selected from the group consisting of (a) a polyhydric alcohol and (b) a combination of the specified minimum amount of a polyhydric alcohol and an additional amount of a monohydric alcohol, a pigment, and a non-aqueous medium.

2. A composition as claimed in claim 1 wherein the diene resin component is derived from a hydrocarbon fraction with a boiling range of 20° to 180° C.

3. A composition as claimed in claim 1 wherein the diene resin component has a melting point of at least 40° C and a bromine number of at least 30.

4. A composition as claimed in claim 1 wherein the polycarboxylic acid component is an α,β-unsaturated polycarboxylic acid having from 4 to 8 carbon atoms or a functional thereof.

5. A composition as claimed in claim 1 wherein the polycarboxylic acid component contains carboxyl groups esterified with an alcohol containing up to 20 carbon atoms.

6. A composition as claimed in claim 1 which additionally contains an olefinically unsaturated monocarboxylic acid component selected from the group consisting of a monocarboxylic acid containing from 3 to 12 carbon atoms and a functional derivative thereof which monocarboxylic acid component is present in an amount up to 200% by weight of the polycarboxylic acid component.

7. A composition as claimed in claim 1 wherein the diene resin component is an aliphatic diene resin modified by at least one other natural or synthetic resin selected from the group consisting of a hydrocarbon resin, an acid - modified hydrocarbon resin and colophony.

8. A composition as claimed in claim 1 which additionally contains a mono - or polyhydric free phenol in an amount up to 5% by weight of the diene resin component.

9. A composition as claimed in claim 1 wherein from 0.1 to 10% of the unesterified carboxyl groups are present in salt form with a metal of groups I to III of the Periodic Table.

10. A composition as claimed in claim 1 wherein the diene resin component (A) the diene resin component has a melting point of at least 40° C and a bromine number of at least 30 and is derived from a hydrocarbon fraction with a boiling range of 20 to 180° C and the polycarboxylic acid component (B) is an α,β-unsaturated polycarboxylic acid having from 4 to 8 carbon atoms or a functional derivative thereof the carboxyl groups thereof are esterified with an alcohol containing up to 20 carbon atoms.

11. The printing ink composition of claim 1 in which said diene resin component is derived by thermal polymerization at temperatures between 200° and 300° C.

12. The printing ink composition of claim 1 in which the alcohol reactant is selected from the group consisting of an at least dihydric and an at most trihydric alcohol.

13. The printing ink composition of claim 12 in which the diene resin component is derived by thermal polymerization at temperatures between 200° and 300° C.

* * * * *